United States Patent [19]
Horski et al.

[11] Patent Number: 5,977,666
[45] Date of Patent: *Nov. 2, 1999

[54] ELECTRIC MOTOR HAVING BRUSH NOISE ABSORPTION SYSTEM

[75] Inventors: Marek Horski; Haran K. Periyanthamby; Peter A. Kershaw, all of London, Canada

[73] Assignee: Siemens Canada Limited, Mississauga, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/102,929

[22] Filed: Jun. 23, 1998

[51] Int. Cl.⁶ .............................. H02K 5/24; H01R 39/38
[52] U.S. Cl. ............................ 310/51; 310/238; 310/244
[58] Field of Search ................................ 310/51, 89, 238, 310/239, 242, 244, 246

[56] References Cited

U.S. PATENT DOCUMENTS

| | | | |
|---|---|---|---|
| 1,763,549 | 6/1930 | Apple | 310/239 |
| 2,662,195 | 12/1953 | Fisher et al. | 310/59 |
| 2,894,239 | 7/1959 | Schaffer et al. | 310/244 |
| 3,527,969 | 9/1970 | Papst | 310/51 |
| 3,546,504 | 12/1970 | Janssen et al. | 310/51 |
| 4,638,204 | 1/1987 | Kirchner et al. | 310/239 |
| 4,639,629 | 1/1987 | Casanova | 310/248 |
| 5,235,227 | 8/1993 | Fazekas | 310/51 |
| 5,272,285 | 12/1993 | Miller | 181/202 |
| 5,414,317 | 5/1995 | Reid et al. | 310/239 |
| 5,434,463 | 7/1995 | Horski | 310/248 |
| 5,453,646 | 9/1995 | Gleixner et al. | 310/51 |
| 5,696,418 | 12/1997 | Corbach et al. | 310/239 |

*Primary Examiner*—Clayton LaBalle

[57] ABSTRACT

An ultra quiet electric motor includes a drive shaft, bearing structure rotatably supporting the drive shaft, and an armature assembly and commutator each fixed on the drive shaft. A motor housing is disposed around the armature assembly and has an open end portion. A permanent magnet structure is disposed between the motor housing and the armature. Brush structure is provided having a pair of brush support arms each guiding a generally crescent-shaped brush. Each of the brushes contacts the commutator. A noise absorbing housing is defined by a plurality of walls and is disposed generally around the brush structure. Noise absorption material covers at least a portion of at least one of the walls of the noise absorbing housing. An end cap is fixed to the motor housing to close the open end portion thereof. The structure of the motor is such that during operation, a decibel rating of approximately 32 dbA is generated.

20 Claims, 2 Drawing Sheets

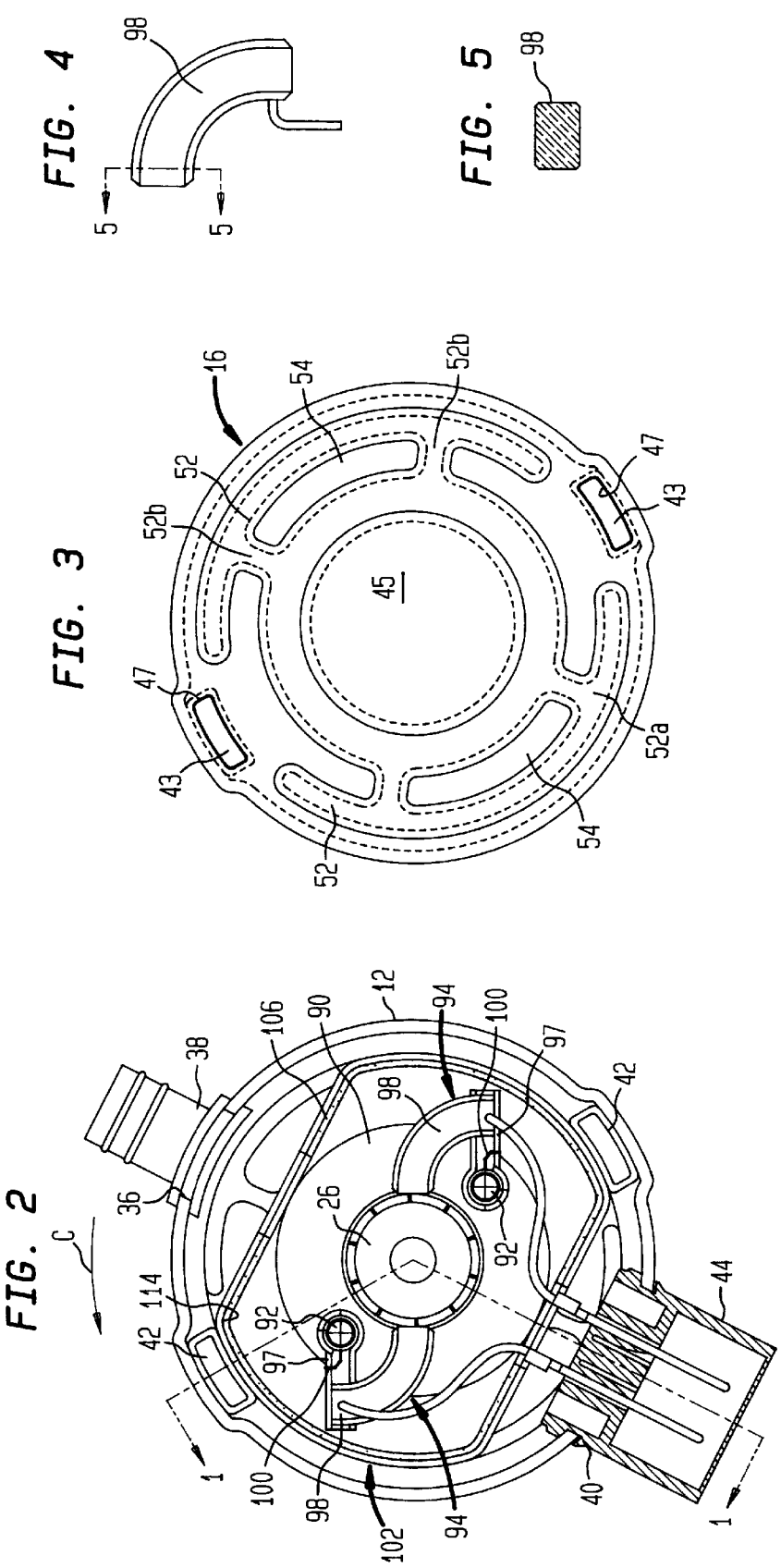

ELECTRIC MOTOR HAVING BRUSH NOISE ABSORPTION SYSTEM

BACKGROUND OF THE INVENTION

1. Field of the Invention

The present invention relates generally to electric motors for automobile applications and, more particularly, to electric motors incorporating vibration reduction structures to effectively minimize component vibration and noise generated during operation.

2. Description of Related Art

Fractional horsepower direct current electric motors are commonly used in the automotive industry to power heating, ventilation and/or air conditioning systems, radiator engine cooling fans, etc. These motors generally include an outer frame or housing and an armature mounted for rotational movement within the housing. An electric current is carried through electromagnetic windings of the armature to create an electromagnetic field which cooperates with permanently fixed magnets disposed within the housing to cause rotation of the armature thus, powering the system.

Due to various factors such as motor or armature imbalance, unequal magnetic force and bearing defects and hammering effects of the brushes, operation of the motor may cause excessive surface vibration of the motor components. This vibration results in the generation of undesired noise and structural sound which often propagates to the vehicle interior, thereby affecting passenger comfort.

Automotive manufacturers and part suppliers have undertaken efforts to minimize acoustic noise of electric motors. One conventional approach incorporates resilient washers which are positioned about the armature shaft proximate the bearings to resist movement of the armature relative to the frame, thus, attempting to minimize noise created by axial movement of the armature. Other noise suppression approaches include the use of noise absorption materials, and barriers within the motor.

None of the foregoing efforts, however, provides an adequate solution for effective suppression of vibration and noise generated by an electric motor.

SUMMARY OF THE INVENTION

Accordingly, the present invention is directed to a high-speed electric motor for automotive applications that is constructed and arranged to effectively minimize vibration of its component parts and thus suppress noise generated during its operation. In accordance with the principles of the present invention, an ultra quiet electric motor includes a drive shaft, bearing structure rotatably supporting the drive shaft, and an armature assembly and commutator each fixed on the drive shaft. A motor housing is disposed around the armature assembly and has an open end portion. A permanent magnet structure is disposed between the motor housing and the armature. Brush structure is provided having a pair of brush support arms each guiding a generally crescent-shaped brush. Each of the brushes contacts the commutator. A noise absorbing housing is defined by a plurality of walls and is disposed generally around the brush structure. Noise absorption material covers at least a portion of at least one of the walls of the noise absorbing housing. An end cap is fixed to the motor housing to close the open end portion thereof. The structure of the motor is constructed and arranged such that during operation, a decibel rating of approximately 32 dbA is generated.

BRIEF DESCRIPTION OF THE DRAWINGS

Preferred embodiments of the invention are described in greater detail herein below with reference to the drawings wherein:

FIG. 2 is a plan view of the motor of FIG. 1, shown with the end cap removed and without a mounting flange, and showing brush structure mounted in a noise absorption housing;

FIG. 3 is an axial plan view of the end cap of the motor of FIG. 1;

FIG. 4 is a plan view of a brush of the brush structure of FIG. 2; and

FIG. 5 is a cross-sectional view taken along the line 5—5 of FIG. 4.

DETAILED DESCRIPTION OF THE PREFERRED EMBODIMENTS

In general, the electric motor of the present invention advantageously incorporates acoustic engineering principles to dramatically minimize vibration and noise levels emitted by the motor, thus decreasing the noise level in the interior of a vehicle. The motor may be adapted for a number of different automotive applications including heat, ventilation, air conditioning systems, radiator engine cooling fans, etc.

Figure 1A:
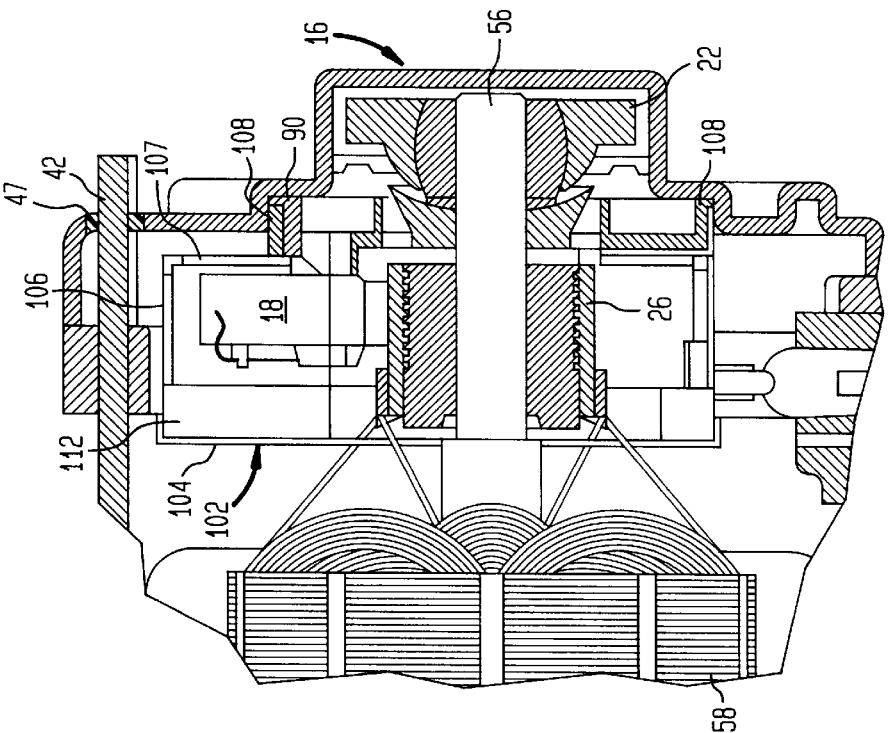
FIG. 1A is a side cross-sectional view of a portion of an armature assembly and end cap of a second embodiment of a motor of the present invention.
Figure 1:
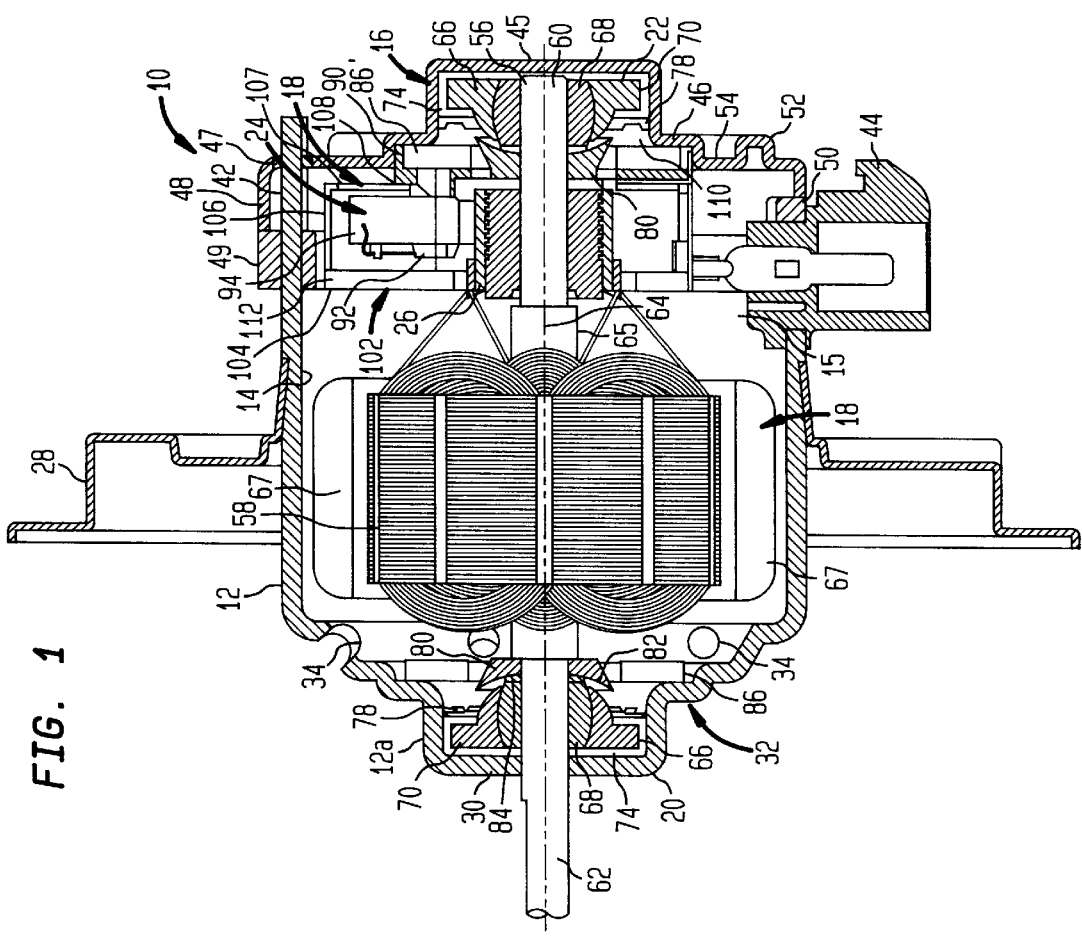
FIG. 1 is a side cross-sectional view of an electric motor provided in accordance with the principles of the present invention taken along the line 1—1 of FIG. 2.

Referring now in detail to the drawings wherein like numerals identify similar or like elements through the several views, FIG. 1 illustrates an ultra quiet electric motor, generally indicated at 10, provided in accordance with principles of the present invention.

The motor 10 includes a housing 12 defining an internal cavity 14 and having open end 15. An end cap 16 is mounted to the rear end of the housing 12 to close the open end 15. An armature assembly, generally indicated at 18, is supported for rotational movement within the housing 12 by front and rear bearing structures 20 and 22. Motor 10 further includes brush structure, generally indicated at 24, mounted adjacent to the end cap 16 and a commutator 26 which cooperates with the brush structure 24 to supply electric current to the armature assembly 18. A mounting flange 28 is coupled to the housing 12 for mounting the motor 10 to a supporting portion of a vehicle.

With reference to FIG.1, housing 12 has a front end 12a which defines a closed central hub portion 30 and a stepped region, generally indicated at 32, characterized by a plurality of extending steps extending from the hub portion 30 of the main portion of the housing 12. Central hub 30 is constructed and arranged to facilitate mounting of bearing structure 20 as discussed in detail below. Stepped region 32 increases the effective length or area of housing front end 12a and consequently enhances absorption of vibration energy emanating from the front bearing assembly 20.

Housing 12 further includes a plurality of ventilation apertures 34 extending through the front end 12a and a cut-out portion 36 (FIG. 2) defined in the housing rear 12b. The cut-out portion 36 accommodates a vent tube 38 which is positioned within the cut-out portion 36 and retained therein by the end cap 16 and brush structure 24. Ventilation apertures 34 and vent tube 38 provide sufficient circulation of air over the armature assembly 18 to cool the assembly components during operation. Housing 12 also defines a second cut-out portion 40 and diametrically opposed mounting tabs 42. Second cut-out portion 40 receives an electrical connector 44.

Mounting tabs 42 facilitate locating and mounting the end cap 16 to the housing 12. As shown in FIGS. 1 and 3, end cap 16 includes tab openings 43 each of which receives an associated mounting tab 42. Each tab opening 43 is lined with a tab insulator 47 preferably of soft plastic or other polymeric material which acts as a vibration isolator between the metal end cap 16 and the metal mounting tabs 42. The use of the mounting tabs 42 and the tab openings simplifies the assembly of the end cap 16 to the motor housing 12. No bolts or other fasteners are required to make this connection.

A vibration absorbing member 49, preferably in the form of a ring, is disposed between the metal end cap 16 and the metal motor housing 12 to isolate vibration energy flow between the end cap 16 and the motor housing 12. The vibration absorbing member 49 thus prevents metal-to-metal contact between the end cap 16 and the motor housing 12. The vibration absorbing member 49 is preferably made of elastomeric material such as rubber and may be made integral with the end cap 16.

Housing 12 is advantageously dimensioned to be in line with passive noise cancellation principles to increase the near field reactive acoustic field around the motor. In general, the phase angle between acoustic pressure and particle velocity fields determines the contents of active and reactive intensity of the near field acoustic propagation. The greater and strength of the reactive field the greater the control on the noise propagation as created by the motor components to the far field. The phase angle is related at least in part to the housing dimensions and, if appropriately selected, the strength of the reactive intensity field may be maximized causing the destruction of the active intensity field generated by the motor components.

In a preferred embodiment of the invention, the housing 12 length diameter ratio is selected to produce a phase angle between 60 degrees and 70 degrees, more particularly, about 65 degrees. The phase angle of about 65 degrees has beemn proven effective in achieving noise cancellation objectives. It is preferable to design the housing 12 such that the length to diameter ratio is less than 1.1.

Referring to FIGS. 1 and 3, the end cap 16 defines a central hub portion 45 and stepped region 46 extending outwardly from the central hub portion 45. Central hub portion 45 is similar in structure and function to the central hub portion 30 of the front end 12a of the housing 12; it facilitates mounting of rear bearing structure 22. The end cap 16 further defines a peripheral lip portion 48 which extends circumferentially about the end cap 16. Peripheral lip portion 48 is advantageously dimensioned to minimize surface vibration of the end cap 16 as will be discussed below. Peripheral lip portion 48 includes a cut-out portion 50 which corresponds to the cut-out portion 40 of the housing 12 to accommodate the electrical connector 44.

End cap 16 defines a stamped pattern about the central hub portion 45 consisting of a series of alternating elongated arcuate raised portions 52 and depressions 54. The raised portions 52 include peripheral arcuate portions 52a and radial portions 52b. This stamped pattern facilitates absorption of vibratory energy created by the rear bearing structure 22 and achieves passive noise cancellation and reduction in surface vibration level. The stamped pattern also helps to shift the natural frequency of the components into a high-end frequency.

End cap 16 is advantageously dimensioned to increase its damping characteristics. In particular, the stamped pattern of alternating raised portions 52 and depressions 54 impedes the flow of vibratory energy. Moreover, the stamped pattern helps to split the large vibrating source transferred to end cap 16 into a number of small vibrating sources, thus, in effect, reducing the overall surface vibration level of the end cap 16.

In addition, the stamped pattern end cap 16 works to reduce the overall noise level by making use of phase variation between the created small vibrating elemental sources. Further, by mutual stiffening with the entire area surface, vibration levels on each small area is also reduced.

In a preferred embodiment, the stamped pattern end cap 16 effectively decreases the surface vibration level of the radiating structure. More specifically, arcuate raised portions 52 and depressions 54 effectively decrease the surface vibration level measured six-fold as compared to production conventional production end caps.

With reference to FIG. 1, the armature assembly 18 includes a shaft 56 and an armature 58 mounted about the shaft 56. The shaft 56 consists of shaft end sections 60 and 62, supported by bearing structures 20 and 22, and an intermediate shaft section 64. A tube-like structure 65 surrounds the immediate shaft section 64 and functions to insulate the armature 58 from the shaft 56. The tube-like structure 65 is preferably formed as two separate tubes positioned over the shaft section 64. Preferably, shaft end sections 60 and 62 and intermediate section 64 are a homogeneous structural member, however, shaft 56 may comprise individual sections 60, 62, 64 joined by conventional means. The overall length of the shaft 56 is reduced by about 20% relative to conventional units. This size reduction facilitates dynamic balancing of the rotor and reduction in mass of the rotating parts, thereby minimizing migratory movement of the shaft and noise generation.

Armature 58 may be any conventional armature and consists of an armature core housing a number of stacked laminations insulation-coated wire windings wound thereabout. The laminations may be treated with inductive heating if desired. Armature 58 is coaxially mounted about shaft 56. A mounting plate (not shown) may be provided for structural connection of the armature core and windings to the intermediate shaft section 64. Armature 58 is in electrical contact with commutator 26 and rotates in response to a magnetic field generated by permanent magnets 67 mounted within housing 12. Armature 58 may be axially centered relative to the magnets 67 or may be off-center with respect to the magnets 67 whereby the armature 58 is pre-loaded to one side.

Referring now to FIG. 1, the front and rear bearing structures 20 and 22 are shown, each being identical with respect to their component parts. Each bearing structure 20 and 22 includes a sleeve bearing housing 66 and a sleeve bearing 68 supported within the bearing housing 66. The bearing housing 66 receives the sleeve bearing 68 in a manner whereby a bearing housing wall portion thereof is in contacting engagement with the sleeve bearing portion received therein. Thus, a substantial surface area of the bearing sleeve 68 is in contact with the bearing housing 66. This feature facilitates transfer of acoustic vibration energy from the sleeve bearing 68 to the bearing housing 66. The specific features of the bearing structures 20 and 22 are disclosed in commonly assigned copending U.S. patent application Ser. No. 08/946,481, entitled "Ultra Quiet Electric Motor for Automotive Applications", the content of which is hereby incorporated by reference into the present specification.

The housing 66 is preferably fabricated from a plastic material to reduce vibration transmission and to permit absorption of vibration energy transferred through sleeve bearing 66 from the shaft 56. Bearing housing 66 may be made by injection molding and is preferably fabricated from polymeric material. Bearing housing 66 also serves to prevent direct contact of the sleeve bearing 68 with the housing front end 12a (or end cap 16). In particular, enlarged base 70 of bearing housing 66 contacts the inner surface of the front end 12a (or end cap 16) and distributes the load (of vibration) on the housing front end 12a (or end cap 16) by bearing sleeve 68. This provides significant advantages over conventional bearing structures where the bearings of prior art motors typically directly contact the housing to create point and/or line loading of the bearings. Such point or line loading undesirably increases vibration of the housing component in direct contact with the bearing. With bearing housing 66 of the president invention, enlarged base 70 advantageously increases the effective area of surface contact between the bearing structures 20 and 22 and the housing from end 12a (or end cap 16) thus distributing the load and minimizing vibration experienced by the housing front end 12a (or end cap 16).

To further minimize vibration energy transfer from each bearing assembly 20 and 22, a bearing housing isolator 76 (FIG. 1) may be wrapped about each bearing housing 66. Isolator 76 is preferably fabricated from energy (acoustic) absorbing materials such as felt, acoustic foam, or similar materials and is intended to absorb or dampen residual acoustic energy emanating from the bearing housing 66.

Each bearing structure 20 and 22 is retained with respective central hub portions 30, 44 of the housing front end 12a and end cap 16 by a bearing housing retainer 78. Bearing housing retainer 78 is preferably fabricated from a resilient spring material (such as spring steel) and is configured to frictionally engage the interior of the respective central hub portion 30, 44. Bearing housing retainer 78 may be of a variety of configurations and may be at least partially accommodated within grooves formed in the surface of the enlarged base 70.

An anti-vibration/dampening washer 80 is disposed about shaft 56 proximate each sleeve bearing 68. Washer 80 is preferably press-fit onto the shaft 56 and serves two functions: 1) arcuate surface 82 of the washer 80 directs any oil which may leak from the sleeve bearing 68 back to the bearing thus increasing bearing life; and 2) the washer 80 dampens axial vibration on the shaft 56 by acting as an elastic spring. This in turn minimizes any excess noise created at the sleeve bearing 68 by shaft movement in the axial direction. At least one resilient washer 84 may be positioned between the washer 80 and the sleeve bearing 66 to accommodate thrust movement of the shaft 56 during operation. Suitable material for the washer 84 includes elastomeric or plastic materials.

A noise absorption member 86 and 86' is positioned adjacent each washer 80. Noise absorption members 86 and 86' are each preferably of a ring configuration defining an internal aperture for receiving at least a portion of the washer 80. Noise absorption members 86 and 86' are each fabricated from noise absorbing material such as felt, fiberglass, etc. Noise absorbing members 86 and 86' acoustically isolate the front and rear bearings structures 22, 22 from the armature section of the motor to absorb residual noise generated by the respective bearing structures 20, 22.

With reference to FIGS. 1 and 2, the brush structure 24 includes a brush support member 90 having a pair of mounting posts 92 extending therefrom. The brush support member 90, preferably made of plastic, is coupled to the end cap 16. A brush assembly 94 is carried by a respective mounting post 92. In accordance with the principles of the present invention, each brush assembly 94 includes a brush support arm 97 having a crescent-shaped or arcuate-shaped brush 98 supported therein (FIGS. 2, 4 and 5). Each brush 98 is carried by a support arm 97 which is coupled to an associated mounting post 92. The support arm 97 may be composed of metal or plastic material. The brush assemblies 94 are positioned so the brushes 98 are in contact with the commutator 26. Each support arm 97 retains an associated crescent-shaped brush 98 to remain in contact with the commutator 26. Torsional brush springs 100 each have a first end coupled to an associated mounting post 92 and a second end thereof biases an associated brush 98 in an arcuate direction toward the commutator 26. Arrow C in FIG. 2 shows the direction of rotation of the commutator 26.

As shown in FIG. 1, the brush support member 90 together with central hub portion 44 of end cap 16 define a rear bearing chamber 110 housing the rear bearing structure 22. The noise absorption member 86' is positioned adjacent to the brush support member 90 to absorb residual noise generated by the bearing structure 22 as noted above.

In accordance with the principles of the present invention, a noise absorbing housing, generally indicated at 102, is shown in FIGS. 1 and 2. The noise absorbing housing 102 is composed preferably of plastic material capable of maintaining its shape in a temperature range of about −40 to 80 degrees Celsius. The noise absorbing housing 102 has a bottom wall 104, four side walls 106 extending from the bottom wall 104, a top wall 107, and a mounting portion 108 to couple the noise absorbing housing 102 to the end cap 16. It is preferable to make the noise absorption housing 102 divisible into at least two parts for ease of assembly. A noise absorbing member 112 covers the bottom wall 104 (FIG. 1), while a thinner noise absorption member 114 covers the side walls 106 (FIG. 2) and the top wall 107. The noise absorption members 112 and 114 are preferably composed of noise absorption material such as felt. Thus, the noise absorbing housing 102 generally surrounds the brush structure 24 and the noise absorption members 112 and 114 absorb residual noise generated by the brush structure 24.

In the embodiment of FIG. 1A, the noise absorption member 86' of FIG. 1 is omitted, however, noise absorption member 112 adjacent to the bottom wall of the noise absorbing housing 102 is made thicker to provide acoustic isolation.

The motor of the present invention having the crescent-shaped brush structure and the noise absorbing housing is effective in minimizing noise generated by the motor during operation. The motor of the present invention has been measured to generate a noise level of approximately 32 dbA overall when taken at 10 cm distances from the motor surface. Conventional noise specification stands at about 40 dbA, thus the motor of the invention substantially decreases noise.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:

a drive shaft;

bearing structure rotatably supporting said drive shaft;

an armature assembly and commutator each fixed on said drive shaft;

a motor housing disposed around said armature assembly and having an open end portion;

permanent magnet structure disposed between said motor housing and said armature;

brush structure having at least one pair of brush support arms each guiding a generally crescent-shaped brush, each of said brushes contacting said commutator;

a noise absorbing housing defined by a plurality of walls and being disposed generally around said brush structure;

noise absorption material covering at least a portion of at least one of said walls of said noise absorbing housing; and an end cap fixed to said motor housing to close said open end portion thereof.

2. The electric motor according to claim 1, further comprising a spring member biasing each of said brushes towards said commutator.

3. The electric motor according to claim 1, wherein said brush structure includes a brush support member coupled to said end cap, said brush support structure carrying said brush structure, said end cap and said brush support member defining a bearing chamber with said bearing structure disposed in said bearing chamber, wherein noise absorption material is disposed adjacent said brush support structure in said bearing chamber.

4. The electric motor according to claim 1, wherein said noise absorbing housing includes a bottom wall, side walls and a top wall, and said noise absorption material covers at least a portion of said bottom wall, said top wall and each of said side walls.

5. The electric motor according to claim 4, wherein said noise absorption material on said bottom wall is thicker than noise absorption material on any other wall.

6. The electric motor according to claim 1, wherein said noise absorption material is felt material.

7. The electric motor according to claim 1, wherein said noise absorbing housing is made of plastic.

8. The electric motor according to claim 1, wherein said noise absorbing housing is coupled to said end cap.

9. The electric motor according to claim 1, further comprising a vibration absorbing member mounted between said end cap and said motor housing and being constructed and arranged to isolate vibration energy flow between said end cap and said motor housing.

10. The electric motor according to claim 9, wherein said motor housing is generally cylindrical and said vibration absorbing member is generally of ring-shape.

11. The electric motor according to claim 9, wherein said vibration absorption member is made of rubber.

12. The electric motor according to claim 1, wherein said motor housing includes mounting tabs at said open end thereof and said end cap includes surfaces defining openings, each said opening receiving an associated said mounting tab to mount said end cap to said motor housing.

13. The electric motor according to claim 12, further comprising an insulator disposed in each of said openings between said surfaces defining said opening and said mounting tab.

14. The electric motor according to claim 13, wherein said end cap and said motor housing are each made of metal and said insulators are made of plastic.

15. The electric motor according to claim 1, further including noise absorbing material at least partially surrounding said bearing structure to absorb acoustic energy.

16. The electric motor according to claim 1, further including an anti-vibrational washer mounted to the shaft adjacent said bearing structure constructed and arranged to absorb vibration energy transferred along the drive shaft.

17. An electric motor comprising:

a drive shaft;

bearing structure rotatably supporting said drive shaft;

an armature assembly and commutator each fixed on said drive shaft;

a motor housing disposed around said armature assembly and having an open end portion;

permanent magnet structure disposed between said motor housing and said armature;

brush structure disposed in said motor housing and having a pair of brushes, each of said brushes contacting said commutator;

a noise absorbing housing defined by a plurality of walls and being disposed generally around said brush structure;

noise absorption material covering at least a portion of at least one of said walls of said noise absorbing housing; and an end cap fixed to said motor housing to close said open end portion thereof.

18. The motor according to claim 17, wherein said brush structure has a pair of brush support arms each guiding a generally crescent-shaped brush to contact said commutator.

19. An electric motor comprising:

a drive shaft;

a pair of bearing structures rotatably supporting said drive shaft at opposing ends thereof;

an armature assembly and commutator each fixed on said drive shaft;

a motor housing disposed around said armature assembly and having an open end portion;

permanent magnet structure disposed between said motor housing and said armature;

brush structure having at least one pair of brush support arms each guiding a generally crescent-shaped brush, each of said brushes contacting said commutator;

a noise absorbing housing defined by a plurality of walls and being disposed around said brush structure;

noise absorption material covering at least a portion of at least one of said walls of said noise absorbing housing;

an end cap coupled to said motor housing to close said open end portion thereof;

a vibration absorbing member between said end cap and said housing constructed and arranged to isolate vibration energy flow between said end cap and said motor housing; and noise absorbing material at least partially surrounding each of said bearing structures.

20. The electric motor according to claim 19, further including an anti-vibrational washer mounted to the shaft adjacent said bearing structure constructed and arranged to absorb vibration energy transferred along the drive shaft.

* * * * *